(12) United States Patent
Helenius et al.

(10) Patent No.: US 11,465,883 B2
(45) Date of Patent: Oct. 11, 2022

(54) ELEVATOR ARRANGEMENT INCLUDING ROPE POSITION DETECTOR AND ELEVATOR

(71) Applicant: Kone Corporation, Helsinki (FI)

(72) Inventors: Juha Helenius, Vantaa (FI); Mika Juntunen, Espoo (FI); Samuel Markkula, Hyvinkaa (FI)

(73) Assignee: Kone Corporation, Helsinki (FI)

(*) Notice: Subject to any disclaimer, the term of this patent is extended or adjusted under 35 U.S.C. 154(b) by 1063 days.

(21) Appl. No.: 15/963,214

(22) Filed: Apr. 26, 2018

(65) Prior Publication Data

US 2018/0319627 A1    Nov. 8, 2018

(30) Foreign Application Priority Data

May 5, 2017 (EP) ................................ 17169668

(51) Int. Cl.
  *B66B 5/12* (2006.01)
  *B66B 7/06* (2006.01)
  (Continued)

(52) U.S. Cl.
  CPC ............... *B66B 5/12* (2013.01); *B66B 7/06* (2013.01); *B66B 7/1238* (2013.01); *G01B 11/16* (2013.01); *G01B 17/04* (2013.01)

(58) Field of Classification Search
  CPC ... B66B 5/1215; B66B 5/0031; B66B 7/1215; B66B 11/008; B66B 1/3492; B66B 5/00;
  (Continued)

(56) References Cited

U.S. PATENT DOCUMENTS

| | | |
|---|---|---|
| 4,460,065 A | 7/1984 | Saxer |
| 2015/0060588 A1* | 3/2015 | Lehtinen ................ B66B 19/02 242/407 |

(Continued)

FOREIGN PATENT DOCUMENTS

| | | |
|---|---|---|
| CN | 1486276 A | 3/2004 |
| CN | 101343010 A | 1/2009 |

(Continued)

OTHER PUBLICATIONS

Extended European Search Report for European Patent Application No. 17169668 dated Nov. 10, 2017.

*Primary Examiner* — Christopher Uhlir
(74) *Attorney, Agent, or Firm* — Harness, Dickey & Pierce, P.L.C.

(57) ABSTRACT

An elevator arrangement, comprising at least one rope connected with an elevator car; a rope wheel arrangement comprising at least one rope wheel around which the rope passes turning around an axis, which extends in width direction of the rope; and a rope position detector arranged to detect displacement of the rope over at least one limit position and to trigger one or more predetermined actions in response to detecting displacement of the rope over a limit position. The rope is arranged to pass around a rope wheel turning around an axis, which extends in width direction of the rope, and the rope position detector is arranged to detect displacement of the rope over a limit position in thickness direction of the rope at a detection point, and to trigger one or more predetermined actions in response to detecting displacement of the rope in its thickness direction over the limit position, said limit position being on the opposite side of the rope than said rope wheel.

14 Claims, 7 Drawing Sheets

(51) Int. Cl.
*B66B 7/12* (2006.01)
*G01B 11/16* (2006.01)
*G01B 17/04* (2006.01)

(58) Field of Classification Search
CPC ...... B66B 5/0006; B66B 5/0018–0037; B66B 5/0087; B66B 5/12
USPC ........................................................ 187/277
See application file for complete search history.

(56) References Cited

U.S. PATENT DOCUMENTS

2015/0329319 A1* 11/2015 Lehtinen ............... B66B 7/1215
    187/254
2016/0046463 A1* 2/2016 Saarelainen ............. B66B 5/02
    187/254

FOREIGN PATENT DOCUMENTS

| CN | 103003182 A | 3/2013 |
| EP | 2947034 A1 | 11/2015 |
| EP | 2987758 A1 | 2/2016 |
| EP | 3095743 A1 | 11/2016 |
| WO | WO-2007/144456 A1 | 12/2007 |
| WO | WO-2012015429 A1 | 2/2012 |

* cited by examiner

ELEVATOR ARRANGEMENT INCLUDING ROPE POSITION DETECTOR AND ELEVATOR

This application claims priority to European Patent Application No. EP171696685 filed on May 5, 2017, the entire contents of which are incorporated herein by reference.

FIELD OF THE INVENTION

The invention relates to detection of reduced rope tension of an elevator. The elevator is preferably an elevator for vertically transporting passengers and/or goods.

BACKGROUND OF THE INVENTION

An elevator typically comprises an elevator car and a counterweight, which are vertically movable in a hoistway. These elevator units are interconnected by suspension ropes that suspend the elevator units on opposite sides of one or more rope wheels mounted higher than these elevator units. For providing force for moving the suspension ropes, and thereby also for the elevator car and a counterweight, one of the wheels is typically a drive wheel engaging the suspension ropes. The elevator car and the counterweight may need to be interconnected by ropes which hang from the elevator car and the counterweight. This type of ropes are often used to provide compensation for the weight of the hoisting ropes. Particularly, in this way the unbalance, which is caused by the suspension ropes in situations where the elevator car is run to its extreme position, can be eliminated. However, these ropes may alternatively or additionally be used to provide a so called tie-down function for the elevator.

One or more of the ropes may, for some reason, develop slack more than the others. The other ropes then bear a higher portion of a load exerted on the ropes. It would be optimal that all the ropes contribute in load bearing function evenly. Slackness of a rope is also harmful as it may cause displacement of the rope from rope wheels, get broken or break other components of the elevator.

Previously, such means have been contemplated which include force sensors mounted in conjunction with the hitch device and configured to sense rope tension of the suspension ropes. This could be used for obtaining an alert if tension of one or more of the ropes goes below a limit. Thereby, if one of the ropes is cut, the elevator can notice and react to it. A drawback of such a solution is that it requires installing an additional electrical device in conjunction of the hitch device, which is a place where additional devices may not fit and where electrification may be difficult to provide. Therefore, it has come up a need for an alternative solution.

Related prior art has been disclosed in document WO 2007144456 A1, for instance.

BRIEF DESCRIPTION OF THE INVENTION

The object of the invention is to introduce an elevator arrangement as well as an elevator, which are improved in terms of detection of lowered rope tension. An object is particularly to introduce a solution by which one or more of the above defined problems of prior art and/or problems discussed or implied elsewhere in the description can be solved. Embodiments are presented, inter alia, which make possible detection of lowered rope tension without additional components in conjunction with the movable elevator units of the elevator. Embodiments are presented, where this is realized independent of the roping ratio of the elevator.

It is brought forward a new elevator arrangement, comprising at least one rope connected with an elevator car, the rope having a width, thickness, and length; a rope wheel arrangement comprising at least one rope wheel around which the rope passes turning around an axis, which extends in width direction of the rope; a rope position detector arranged to detect displacement of the rope over at least one limit position and to trigger one or more predetermined actions in response to detecting displacement of the rope over a limit position. The rope is arranged to pass around a rope wheel of said rope wheel arrangement turning around an axis, which extends in width direction of the rope, and the rope position detector is arranged to detect displacement of the rope over a limit position in thickness direction of the rope at a detection point, and to trigger one or more predetermined actions in response to detecting displacement of the rope in its thickness direction over the limit position, said limit position being on the opposite side (in thickness direction) of the rope than said rope wheel. With this solution one or more of the above mentioned objects can be achieved. Preferable further details are introduced in the following, which further details can be combined with the elevator arrangement individually or in any combination.

In a preferred embodiment, the rope is arranged to pass tangentially away from the rope wheel further to the detection point where it bypasses the limit position.

In a preferred embodiment, the rope is arranged to pass tangentially away from the rope wheel further to the detection point where it bypasses the limit position unsupported in thickness direction thereof.

In a preferred embodiment, the rope is a rod having a straight form when in rest state and elastically bendable away from the straight form. Hereby, the rope section turning around a rope wheel, and therefore bent into an arc, is under substantial bending tension.

In a preferred embodiment, said one or more predetermined actions include one or more of stopping the elevator car, preventing further starts of elevator car, sending an alarm signal.

In a preferred embodiment, said limit position is at a distance from the rope, in particular from the rope surface facing the limit position, in thickness-direction of the rope.

In a preferred embodiment, said rope wheel is the closest rope wheel to the detection point where the rope bypasses beside the limit position.

In a preferred embodiment, the rope is substantially larger in width direction than thickness direction. This is advantageous in combination with the particular manner of detection, because the smaller the moment of inertia, the larger are the displacement changes caused by tension variation.

In a preferred embodiment, said rope is a suspension rope of the elevator for suspending the elevator car. Alternatively, the elevator comprises a counterweight, and said rope hangs from the elevator car and the counterweight and said rope wheel is mounted within the lower end of the hoistway.

In a preferred embodiment, the departing point of the rim of the rope wheel where the rope departs from, i.e. loses contact with, the rim of the rope wheel and the detection point p where the rope bypasses beside the limit position, are at a distance from each other.

In a preferred embodiment, the distance between the departing point of the rim of the rope wheel where the rope departs from, i.e. loses contact with, the rim of the rope wheel and the detection point p where the rope bypasses the limit position, is less than 0.5 meters. The distance is however preferably more than 0.1 meters. Most preferably the distance is between 0.15 and 0.35 meters.

In a preferred embodiment, the rope position detector is a contactless detector, particularly forming a contactless sensing zone on thickness directional side of the rope.

In a preferred embodiment, the rope position detector is arranged to sense ultrasonic sound or electromagnetic radiation from said limit position and/or its proximity.

In a preferred embodiment, the position detector comprises a receiver arranged to receive ultrasonic sound or electromagnetic radiation from said limit position and/or its proximity.

In a preferred embodiment, the position detector comprises a sender for sending ultrasonic sound or electromagnetic radiation towards said limit position and/or its proximity.

In a preferred embodiment, the rope position detector is a light curtain device.

In a preferred embodiment, the receiver comprises one or more photocells, one or more laser beam sensors, one or more ultrasonic sensing devices, one or more optical cameras, one or more scanners, one or more machine vision devices, or one or more pattern recognition devices.

In a preferred embodiment, the rope position detector comprises on thickness directional side of the rope a sensing member positioned at the limit position. The surface of the sensing member defines, particularly the surface of the sensing member facing the rope, said limit position. The sensing member is displaceable by the rope displaced in it thickness direction to collide into contact with the sensing member. Displacement of the sensing member is arranged to trigger said one or more predetermined actions.

In a preferred embodiment, the sensing member or at least the surface portion thereof facing the rope, is made of or at least comprises non-metallic material. Hereby, risk of cutting the rope as a result of the collision between the rope and a sensing member can be eliminated or at least reduced. The non-metallic material has preferably Shore A hardness smaller than 95 and/or Youngs modulus less than 10 GPa. For example polymer materials having this kind of properties are widely available.

In a preferred embodiment, the sensing member or at least the surface portion thereof facing the rope, comprises polymer material. The sensing member or at least the surface portion thereof facing the rope is preferably made of plastic, elastomer or fiber reinforced plastic. Hereby, risk of cutting the rope as a result of the collision between the rope and a sensing member can be eliminated or at least reduced.

In a preferred embodiment, the sensing member is displaceable at least in the longitudinal direction of the rope, whereby the rope, when it moves in its longitudinal direction during elevator use and is displaced in its thickness direction to collide into contact with the sensing member, is arranged to engage the sensing member and push and displace it at least in the longitudinal direction of the rope.

In a preferred embodiment, the sensing member is mounted pivotally displaceably around an axis parallel with the width direction of the rope.

In a preferred embodiment, said rope comprises one or more load bearing members extending parallel with the longitudinal direction of the rope unbroken throughout the length of the rope. Preferably, the one or more load bearing members is/are made of composite material comprising reinforcing fibers in polymer matrix, said reinforcing fibers preferably being carbon fibers. This kind of structure facilitates good load supporting properties, and provides a rod-like structure that is elastically bendable. The structure also makes the rope to require a great force to bend, which causes a great bending tension. Thereby, displacement due to reduced rope tension can be particularly simply be detected with the rope position detector as defined. As mentioned, said reinforcing fibers are preferably carbon fibers. These fibers facilitate rope lightness and tensile stiffness, thereby making the rope well suitable for elevator use. In this case especially, the rope has a forceful tendency to straighten. Thereby, the rope position detector solution as disclosed is especially advantageous with this rope. Said reinforcing fibers could alternatively be some other fibers such as glass fibers, for example.

In a preferred embodiment, the reinforcing fibers of each load bearing member are distributed in the polymer matrix of the load bearing member in question and bound together by it. The reinforcing fibers of each load bearing member are then preferably substantially evenly distributed in the polymer matrix of the load bearing member in question. Furthermore, preferably, over 50% of the cross-sectional square area of the load bearing member consists of said reinforcing fibers. Thereby, a high tensile stiffness can be facilitated. Preferably, the load bearing members cover together over proportion 50% of the cross-section of the rope.

In a preferred embodiment said reinforcing fibers are parallel with the longitudinal direction of the rope. The parallel and thereby straight structure increases bending stiffness of the rope.

In a preferred embodiment, said rope comprises a non-metallic coating. Then, preferably said rope comprises one or more load bearing members extending parallel with the longitudinal direction of the rope unbroken throughout the length of the rope one or more load bearing members is/are embedded in a non-metallic coating, preferably polymer coating, preferably elastomer coating. The coating provides protection for the load bearing members, but also provides adjustability in friction properties of the rope surface. Adjustability of friction properties facilitates control of the rope engagement with a detection member both protecting the rope from damage but also increasing or decreasing frictional engagement, whichever is needed.

In a preferred embodiment, the rope passes from said rope wheel to another, the same thickness directional side thereof being against both the rope wheels, whereby the rope bends on the rope wheels in the same direction.

In a preferred embodiment, the rope passes from said rope wheel to another, one thickness directional side thereof being against one of the rope wheels and the other (opposite) thickness directional side thereof being against the other of the rope wheels, whereby the rope bends on the rope wheels in the opposite directions.

In a preferred embodiment, said elevator arrangement is an elevator arrangement for detecting lowered rope tension of a rope of the elevator.

It is also brought forward a new elevator comprising an elevator car and an elevator arrangement as defined anywhere above. With this solution one or more of the above mentioned objects can be achieved. Preferable further details are introduced in the above and elsewhere in the applications, which further details can be combined with the elevator individually or in any combination.

The elevator is preferably such that the car thereof is vertically movable and configured to serve two or more vertically displaced landings. The elevator is furthermore preferably configured to control movement of the car in response to signals from user interfaces located at landing(s) and/or inside the car so as to serve persons on the landing(s) and/or inside the elevator car. Preferably, the car has an interior space suitable for receiving a passenger or passengers, and the car can be provided with a door for forming a closed interior space.

BRIEF DESCRIPTION OF THE DRAWINGS

In the following, the present invention will be described in more detail by way of example and with reference to the attached drawings, in which.

The foregoing aspects, features and advantages of the invention will be apparent from the drawings and the detailed description related thereto.

DETAILED DESCRIPTION

Figure 1:
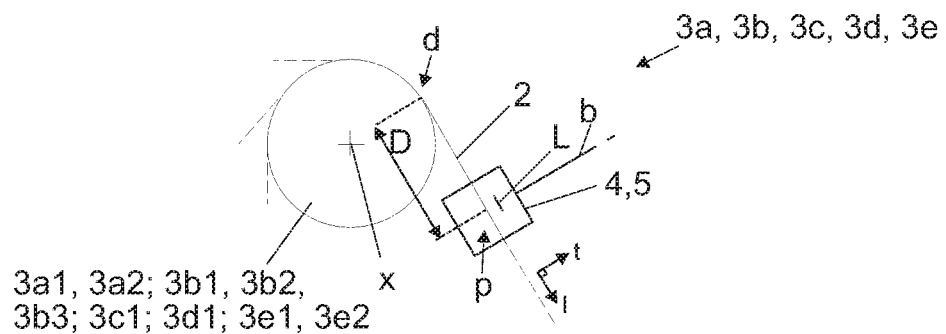
FIG. 1 illustrates an embodiment of an elevator arrangement according to the invention.

FIG. 1 illustrates an embodiment of an elevator arrangement comprising a roping comprising at least one rope 2 connected with an elevator car. The rope is an elongated member having a width, thickness, and length. The elevator arrangement moreover comprises a rope wheel arrangement 3a, 3b, 3c, 3d, 3e comprising a rope wheel 3a1, 3a2; 3b1, 3b2, 3b3; 3c1; 3d1; 3e1, 3e2 around which the rope 2 passes turning around an axis x extending width direction of the rope 2, and a rope position detector 4,5 arranged to detect displacement of the rope 2 over a limit position L in thickness direction t of the rope 2 at a detection point p. Said limit position L is (in thickness direction t) on the opposite side of the rope 2 than said rope wheel 3a1, 3a2; 3b1, 3b2, 3b3; 3c1; 3d1; 3e1, 3e2.

The rope position detector 4,5 is arranged to trigger one or more predetermined actions in response to detecting displacement of the rope 2 in its thickness direction t over the limit position L. FIG. 1 illustrates different wrap angles by aid of the broken lines representing alternative directions where the rope 2 can arrive at the rope wheel showed.

Said one or more predetermined actions preferably include one, two or all of: stopping the elevator car 1, preventing further starts of elevator car 1, sending an alarm signal. The position detector 4,5 is preferably connected with the elevator control system by a bus b for transmitting electrical signals.

The rope 2 is arranged to pass around a rope wheel 3a1, 3a2; 3b1, 3b2, 3b3; 3c1; 3d1; 3e1, 3e2 resting against the rim thereof, and to pass tangentially away from the rope wheel 3a1, 3a2; 3b1, 3b2, 3b3; 3c1; 3d1; 3e1, 3e2 straight further to a detection point p where it bypasses the limit position L. At the detection point p, the rope 2 bypasses the limit position L, preferably unsupported in thickness direction t thereof.

The rope 2 is preferably a rod having a straight form when in rest state and elastically bendable away from the straight form. Such a rope self-reverses back to a straight form from bent form in rest state, i.e. after all bending directed to it ceases. Due to this, the rope section turning around a rope wheel, and therefore bent into an arc, is under substantial bending tension. Thus, should the rope tension drop substantially, the internal bending tension of the rope 2 makes the route of the rope 2 shift towards the limit L in FIG. 1. More specifically, due to bending stiffness the rope 2 is tries to straighten when tension is reduced, and then the rope 2 (the elastic curve thereof) approaches the limit L. With this type of rope 2 the position detector 4,5 can detect lowered rope tension of the rope 2 when placed correctly. For this reason, the limit position L is preferably on opposite side of the rope 2 than said rope wheel 3a1, 3a2; 3b1, 3b2, 3b3; 3c1; 3d1; 3e1, 3e2. The above described can be achieved for example when the said rope 2 comprises one or more load bearing members extending parallel with the longitudinal direction of the rope unbroken throughout the length of the rope, which one or more load bearing members is/are made of composite material comprising reinforcing fibers in polymer matrix. Said reinforcing fibers are preferably carbon fibers, but could alternatively be some other fibers, such as glass fibers.

Said limit position L is at a distance from the rope 2, in particular from the rope surface facing the limit position L. Thereby, displacement of said distance is allowed without triggering of said predetermined actions. Generally, the distance d is preferably less than 5 cm. The distance d is more preferably less than 5 cm and more than 1 mm. The distance d is even more preferably less than 3 cm and more than 1 mm. The distance d is most preferably less than 15 mm and more than 1 mm.

Preferably, a short distance D exists between the departing point of the rim of the rope wheel (3a1, 3a2; 3b1, 3b2, 3b3; 3c1; 3d1; 3e1, 3e2) where the rope (2) departs from, i.e. loses contact with, the rim of the rope wheel (3a1, 3a2; 3b1, 3b2, 3b3; 3c1; 3d1; 3e1, 3e2) and the detection point p where the rope (2) bypasses the limit position L. Said distance D is preferably less than 0.5 meters. Within this distance, in most cases when the tension drop is substantial, the straightening tendency of the rope 2 is adequate to displace the rope 2 to pass along a route substantially farther on the side opposite to the rope wheel than in high tension state. Also, within this distance the rope 2 is still in relatively reliable control also in a tension drop situations whereby risk of the rope 2 overtaking the detection in width direction of the rope 2 is eliminated. Said distance D is however preferably more than 0.1 meters, because a very short distance makes the displacement smaller and more difficult to detect. Most preferably, the distance D is between 0.15 and 0.35 meters, as within this range the detectability of displacement due to tension drop, and reliability of rope control are in good balance. FIGS. 9-12 illustrate how the tension drop is substantial near the rope wheel, and further how positioning the position detector/detection point far from a rope wheel does not bring additional advantage but instead may in some cases be disadvantageous, such as in the case with 500 N tension in FIG. 12. FIGS. 9-12 illustrate rope route with the intended tension 10000 N as well as reduced tensions 500 N and 5000 N. FIGS. 10 and 12 illustrate the rope route in a graph where x and y axis have different scales. FIGS. 10 and 12 illustrate also the most preferred position of the detection point p and the limit position L. The exact location of the limit position in thickness direction of the rope 2 could of course be chosen also differently than showed, in particular such that displacement caused by a tension change becomes detected as desired.

Figure 9:
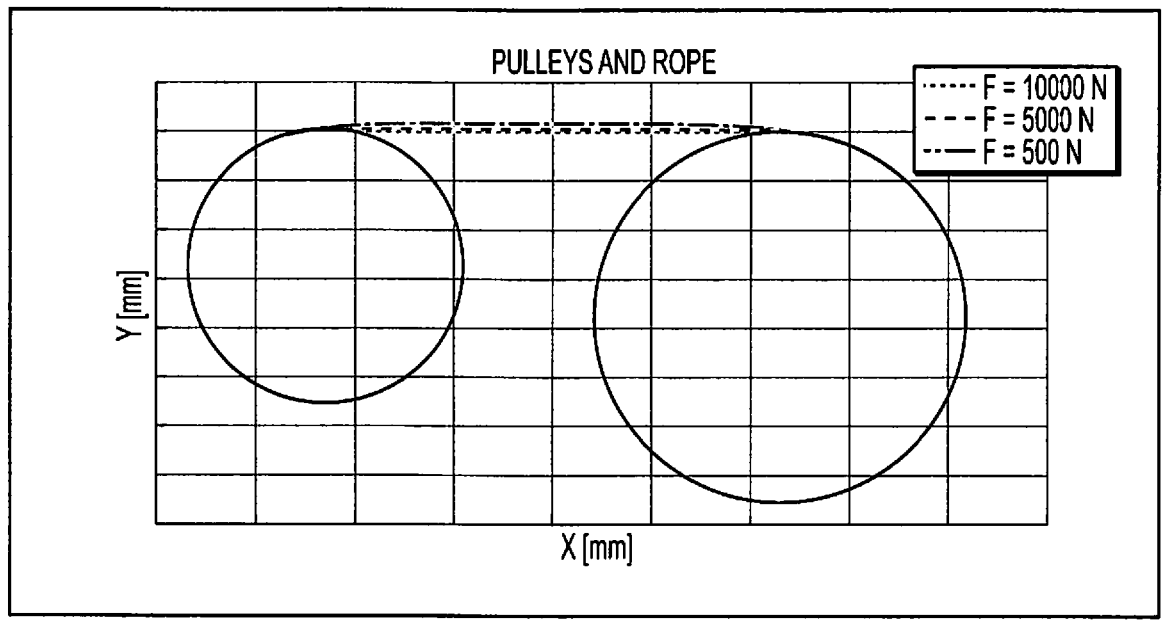
FIGS. 9 and 10 illustrate a preferred configuration where the rope passes a from a rope wheel to another, the same thickness directional side thereof being against both the rope wheels.
Figure 10:
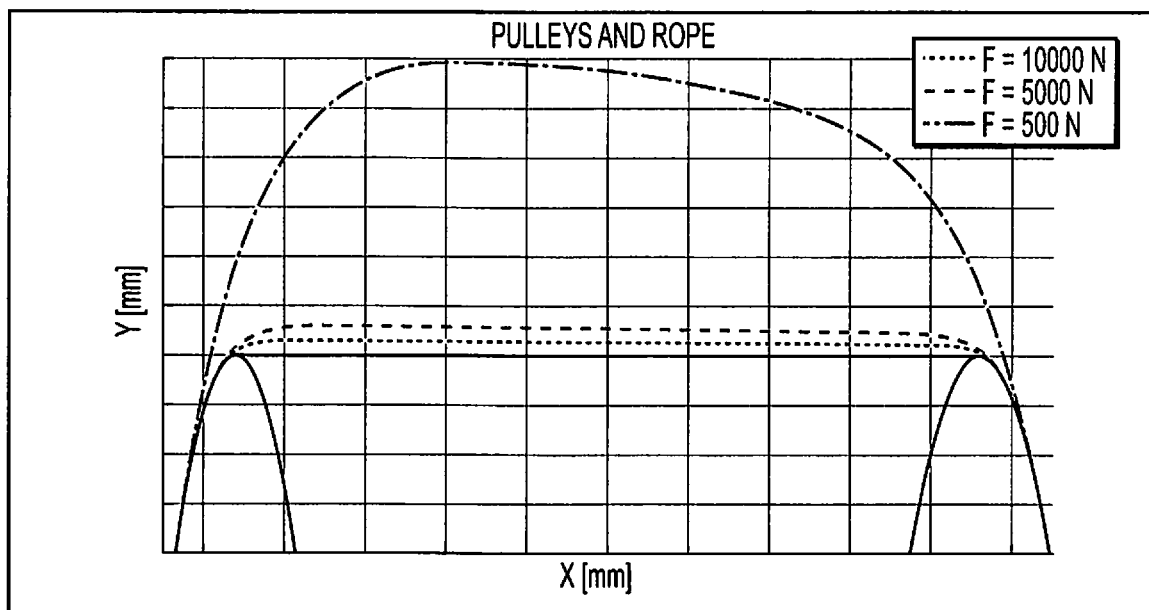

FIGS. 9 and 10 illustrate a configuration where the rope passes a from a rope wheel to another, the same thickness directional side thereof being against both the rope wheels, whereby the rope bends on the rope wheels in the same direction.

Figure 11:
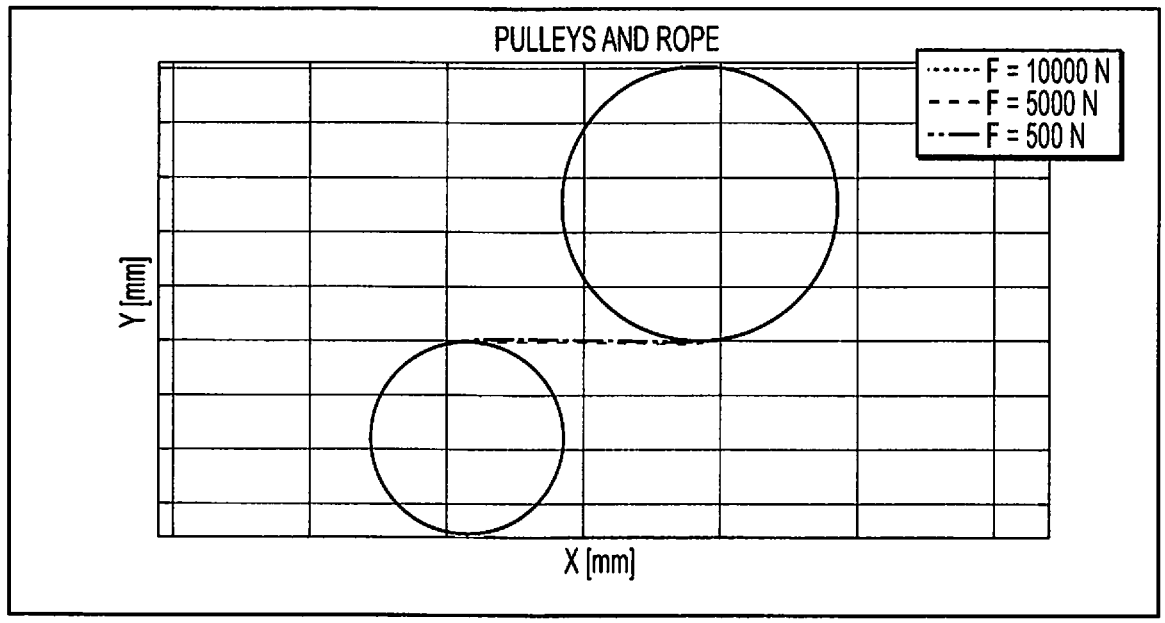
FIGS. 11 and 12 illustrate a configuration where the rope passes a from a rope wheel to another, opposite thickness directional sides thereof being against the rope wheels.
Figure 12:
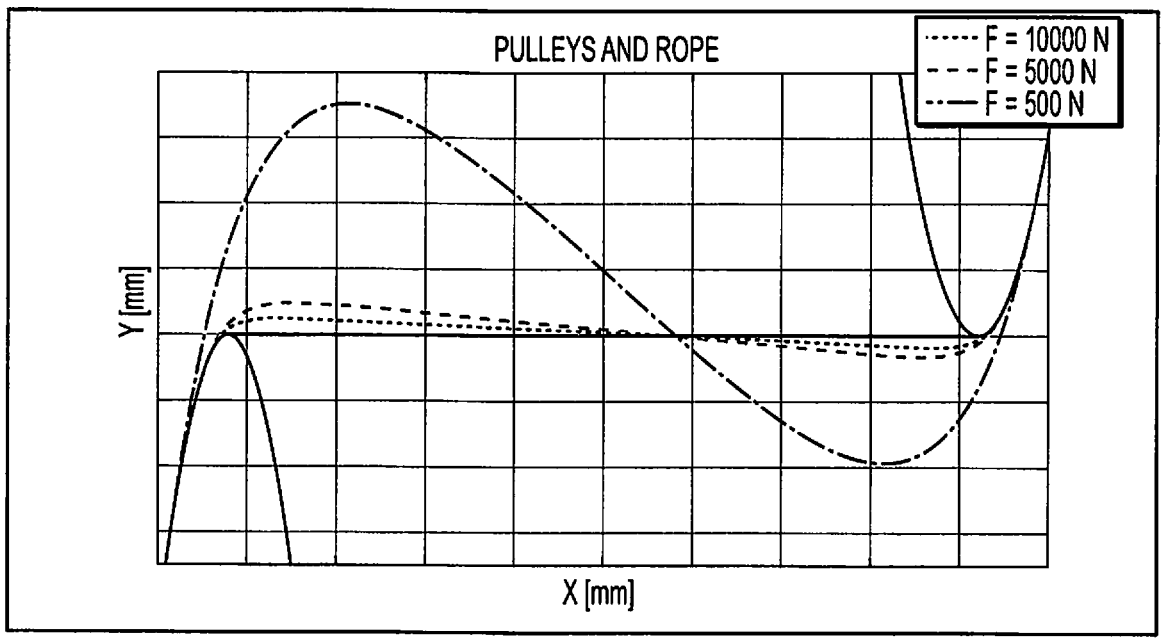

FIGS. 11 and 12 illustrate a configuration where the rope passes a from a rope wheel to another, one thickness directional side thereof being against one of the rope wheels and the other (opposite) thickness directional side thereof being against the other of the rope wheels, whereby the rope bends on the rope wheels in the opposite directions.

Figure 2:
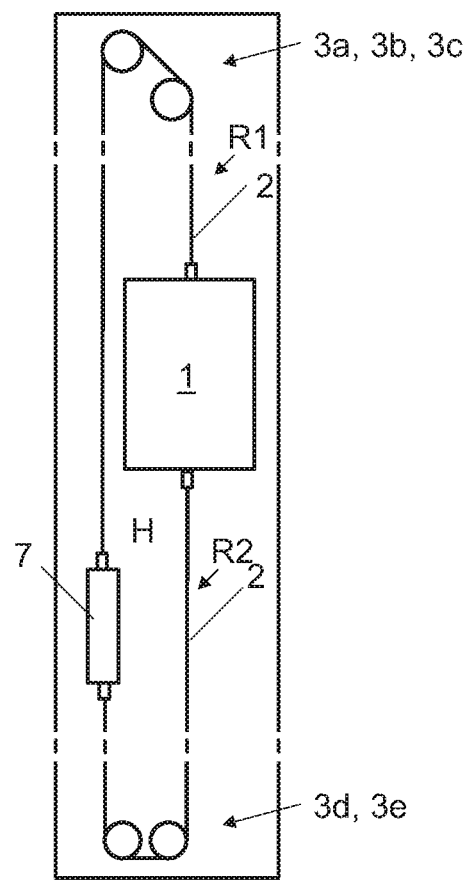
FIG. 2 illustrates an embodiment of an elevator according to the invention.

FIG. 2 illustrates an elevator comprising an elevator car 1 vertically moveable in a hoistway H. The elevator comprises an elevator arrangement of FIG. 1. In the illustrated case, the elevator comprises a counterweight 7, and each said roping R1, R2 interconnects the car and counterweight 7. Roping R1 is a suspension rope of the elevator for suspending the elevator car 1 and counterweight 7, and the other roping R2 is a roping that hangs from the elevator car 1 and the counterweight 7 and passes via the lower end of the hoistway H. Thus, FIG. 2 illustrates how the elevator arrangement of FIG. 1 could be implemented with ropings meant for different functions. Although this elevator comprises two ropings R1 and R2, and passage of each roping is monitored utilizing the elevator arrangement of FIG. 1, monitoring of both of the two ropings by an elevator arrangement of FIG. 1 is not necessary as it could be utilized also with only one of the ropings R1,R2. Moreover, simultaneous presence of these two ropings R1 and R2 is not necessary.

Figure 3:
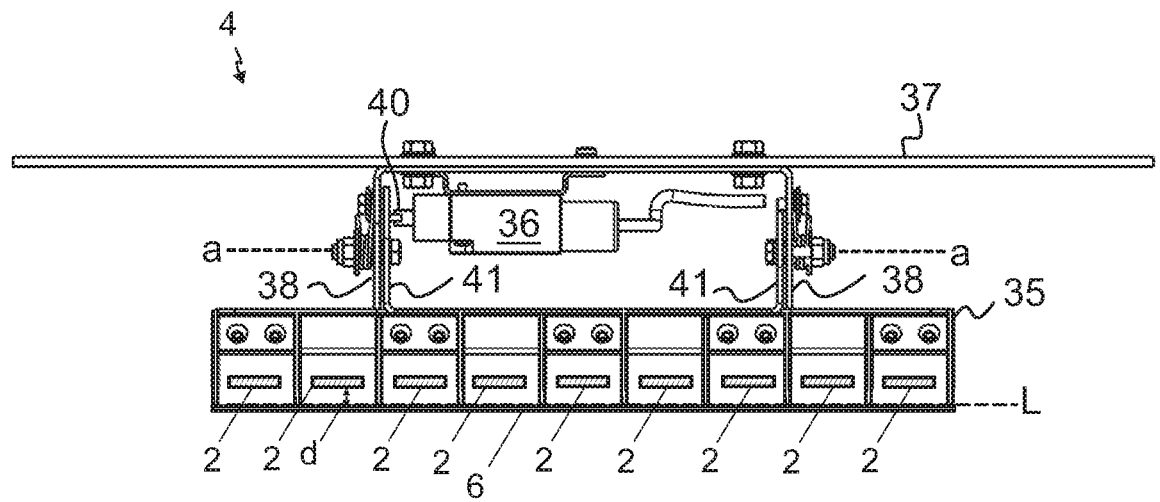
FIG. 3 illustrates an embodiment of a rope position detector of a first kind as viewed in longitudinal direction of the rope.
Figure 4:
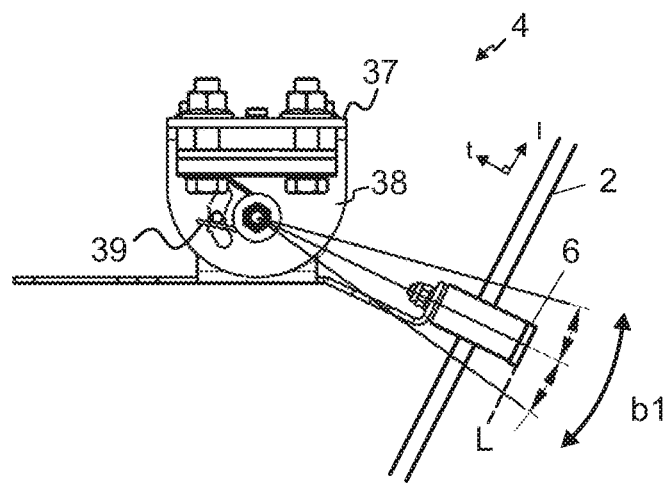
FIG. 4 illustrates rope position detector of FIG. 3 as viewed in width direction of the rope.

FIGS. 3 and 4 illustrate a first kind of means, namely mechanical means, for detecting displacement of the rope 2 over a limit position L. In this embodiment, the rope position detector 4 comprises on thickness directional side of the rope 2 a sensing member 6. The sensing member 6 is positioned at the limit position L. The surface of the sensing member 6, which faces the rope 2 defines said limit position L. The sensing member 6 is displaceable by the rope 2, which is displaced in it thickness direction to collide into contact with the sensing member 6, in particular with said surface of the sensing member 6, which faces the rope 2. Displacement of the sensing member 6 is arranged to trigger said one or more predetermined actions.

So as to eliminate or at least reduce risk of cutting the rope as a result of the collision, the sensing member 6 or at least the surface portion thereof facing the rope 2, is preferably made of or at least comprises substantial amount of non-metallic material. The non-metallic material has then preferably Shore A hardness smaller than 95 and/or Youngs modulus less than 10 GPa. For example polymer materials having this kind of properties are widely available.

So as to eliminate or at least reduce risk of cutting the rope, it is preferable that the sensing member 6 or at least the surface portion thereof facing the rope 2 comprises polymer material, preferably being made of plastic, elastomer or fiber reinforced plastic. The material can be or comprise rubber or polyurethane, for example. Polymer based materials are relatively safe in terms of risk of causing severe rope damage in collision. Moreover, their properties are simple to adjust such that the collision is gentle, but also such that the firmness of frictional engagement between the colliding elements is as desired. Thus, the polymer based material particularly facilitates operation of solutions where frictional engagement is desired between the colliding elements, such of the embodiment presented hereinafter. Of course, frictional engagement could also be an undesired effect, e.g. if the sensing member 6 is to be displaced only in thickness direction of the rope 2, and also in this kind of solution polymer based material is advantageous as by selecting suitable a polymer and additives the material is simply adjustable to have a low friction coefficient.

In the embodiment of FIGS. 3 and 4, the sensing member (6) is displaceable at least in the longitudinal direction of the rope (2), whereby the rope (2), when it moves in its longitudinal direction 1 during elevator use and is displaced in thickness direction t to collide into contact with the sensing member 6, is arranged to engage the sensing member 6 and push and displace it at least in the longitudinal direction of the rope 2. This is implemented such that the sensing member 6 is mounted pivotally displaceably around an axis a parallel with the width direction w of the rope 2.

The rope position detector 4 presented in FIGS. 3 and 4 is moreover such that it comprises at least one electrical sensor 36, arranged to sense position of a displaceable carrier body 35 on which the sensing member 6 is mounted. The sensor is preferably in the form of a switch having a sensing nose 40 sensing the position of the carrier body 35. In the preferred embodiment, the sensing nose 40 extends into an opening formed in one of two flanges 41 of the carrier body 35, via which flanges 41 the carrier body 35 is pivotally mounted on a stationary mounted frame 37, in particular on flanges 38 thereof. The rope position detector 4 preferably also comprise means 39 for resisting said displacement of the carrier body 35. Said means 39 are in the embodiment illustrated in FIG. 4 in the form of one or more spring 39 arranged to resist pivoting of the carrier body 35. The spring(s) is preferably also used for keeping the carrier body 35 positioned such that the sensing member 6 can pivot towards either direction around axis a. In FIG. 4, arrow b1 illustrates the pivoting directions of the carrier body 35. The spring(s) is preferably a helical spring mounted coaxially along the axis a between the carrier body 35 and the frame 37. For achieving the triggering of the one or more actions said sensor 36 can be connected with the elevator control system by a bus b for transmitting electrical signal. One option is that said sensor 36 includes or is connected to a relay r operating a safety switch s of the safety circuit of the elevator, for instance.

The rope position detector 4 presented in FIGS. 3 and 4 is moreover such that the sensing member 6 is elongated in width direction w of the rope 2 extending on the thickness directional side of plurality of ropes 2 and defines a limit position L for said plurality of ropes 2, and is displaceable similarily with any one of the plurality of ropes 2. Thus, with the same sensing member 6 position of plurality of ropes 2 can be detected. In this case, the elevator arrangement comprises plurality of said ropes 2 arranged as defined.

Figure 5:
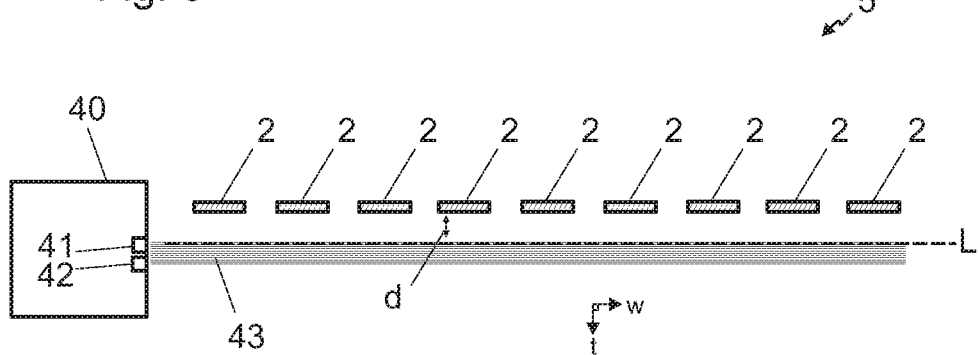
FIG. 5 illustrates an embodiment of a rope position detector of a second kind.

FIG. 5 illustrates a second kind of means for detecting displacement of the rope 2 over a limit position L. In this embodiment, the rope position detector 5 is a contactless detector, particularly forming a contactless sensing zone 43 on thickness directional side of the rope 2. The rope position detector 5 is arranged to sense ultrasonic sound or electromagnetic radiation from said limit position L and/or its proximity. For this purpose, the position detector 5 comprises a receiver 41 arranged to receive ultrasonic sound or electromagnetic radiation from said limit position L and/or its proximity.

The receiver 41 can comprises one or more photocells, one or more laser beam sensors, one or more ultrasonic sensing devices, one or more optical cameras, one or more scanners, one or more machine vision devices, or one or more pattern recognition devices.

Preferably, although not necessarily, the position detector 5 comprises a sender 42 for sending ultrasonic sound or electromagnetic radiation towards said limit position L and/or its proximity.

In case the position detector 5 is to be provided without senders, the ambient light conditions and sound conditions provide electromagnetic radiation and ultrasonic sound to such a degree that displacement of the rope over the limit position changes the observation of the receiving device to a detectable amount whereby it is possible to implement the device without a sender.

FIGS. 9 and 10 illustrate a configuration where the rope passes a from a rope wheel 3*a*1; 3*b*1; 3*e*1 to another 3*a*2; 3*b*2; 3*e*2, the same thickness directional side thereof being against both the rope wheels, whereby the rope bends on the rope wheels in the same direction. The rope 2 does not contact any rope wheels between the two rope wheels 3*a*1; 3*b*1; 3*e*1 and 3*a*2; 3*b*2; 3*e*2.

FIGS. 11 and 12 illustrate a configuration where the rope passes a from a rope wheel 3*b*1 to another 3*b*3, the one thickness directional side thereof being against one of the rope wheels and the other (opposite) thickness directional side thereof being against the other of the rope wheels, whereby the rope bends on the rope wheels in the opposite directions. The rope 2 does not contact any rope wheels between the two rope wheels 3*b*1 and 3*b*3.

Figure 13:
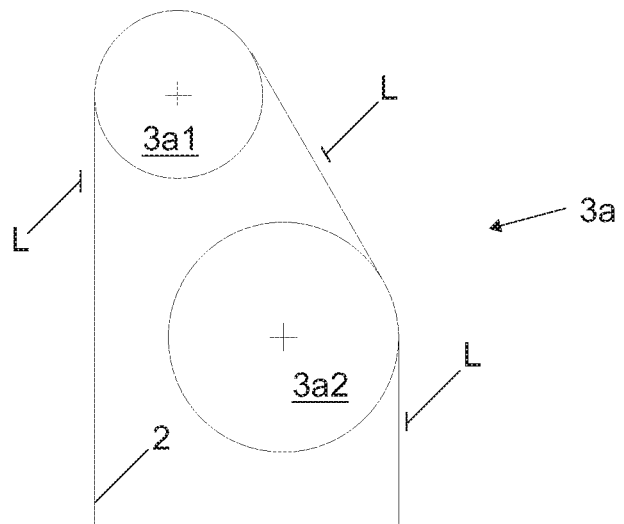
FIGS. 13-15 illustrate different alternative configurations when the rope is a suspension rope.
Figure 14:
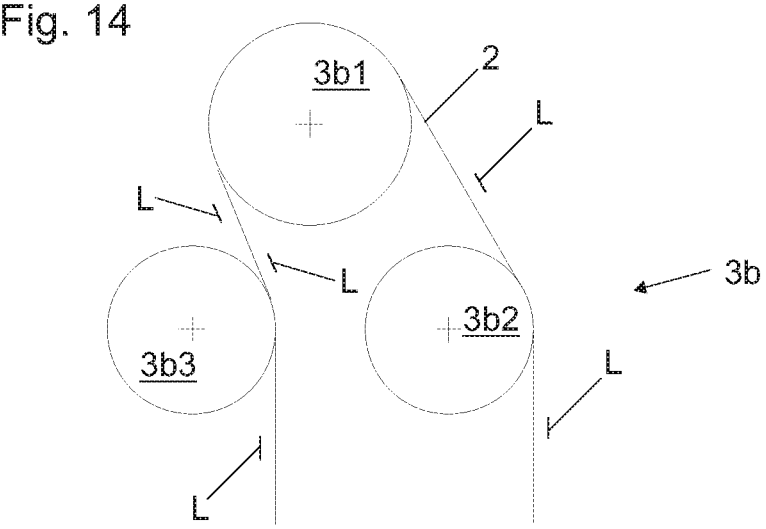
Figure 15:
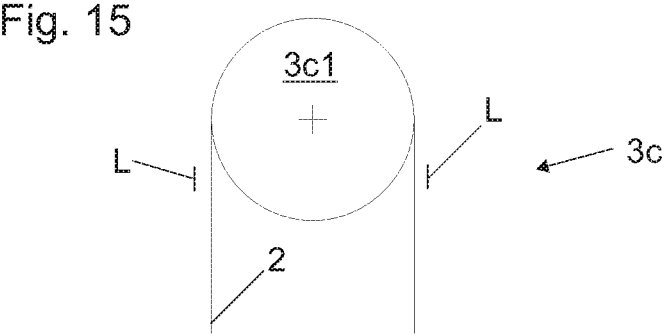

FIGS. 13-15 illustrate different alternative configurations when the rope 2 is a suspension rope.

Figure 16:
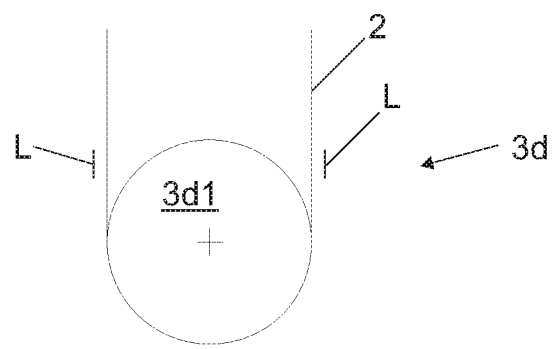
FIGS. 16-17 illustrate different alternative configurations when the rope is a rope hanging from the elevator car and the counterweight.
Figure 17:
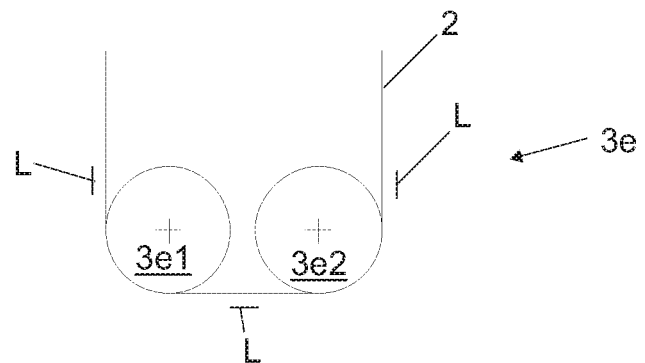

FIGS. 16-17 illustrate different alternative configurations when the rope 2 hangs from the elevator car 1 and the counterweight 7.

Figure 6:
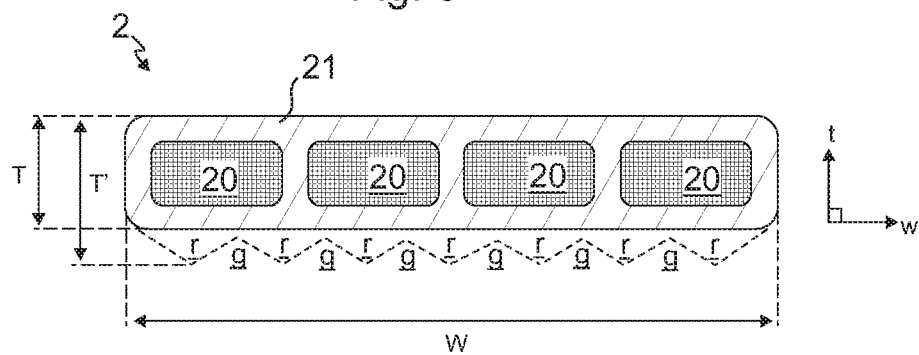
FIG. 6 illustrates a preferred cross section of the rope.

FIG. 6 illustrates preferred details of the rope 2. In this embodiment, the rope 2 is a belt i.e. the rope 2 is substantially larger in its width-direction w than thickness-direction t. The width W of the rope 2 is thereby substantially greater than the thickness T,T' thereof. In this embodiment, the rope 2 comprises plurality of load bearing members 20 extending parallel with the longitudinal direction of the rope 2 unbroken throughout the length of the rope 2. In the presented case, there are four of said load bearing members 20 comprised in the rope 2. However, the rope could be implemented alternatively with a smaller than greater number of load bearing members, such as only one, only too, only three, five, six, seven or even more load bearing members 20.

In a this embodiment, the load bearing members 20 are embedded in a non-metallic coating 21, which is preferably a polymer coating, most preferably an elastomer coating. The coating 21 provides protection for the load bearing members 20, but also adjustability in friction properties of the rope surface. Adjustability of friction properties facilitates control of the rope engagement with a detection member in embodiments where the rope position is detected by aid of a mechanical member defining the limit position. Then the coating 21 both protects the rope 2 from damaging but also sets a desired friction, i.e. either increases the friction thereby increasing frictional engagement or makes the rope more slippery thereby decreasing frictional engagement, whichever is desired. The coating 21 is preferable but not necessary, because the load bearing member 20 could alternatively form the surface of the rope 2. The material of the coating 21 preferably has Shore A hardness smaller than 95 and/or Youngs modulus less than 10 GPa. For example polymer materials having this kind of properties are widely available.

As mentioned, the one or more load bearing members 20 of the rope 2 are made of composite material comprising reinforcing fibers in polymer matrix. Said reinforcing fibers are preferably carbon fibers, but could alternatively be some other fibers, such as glass fibers. A preferred structure of this kind is presented in FIGS. 7 and 8.

In the above, preferably said rope wheel 3*a*1, 3*a*2; 3*b*1, 3*b*2, 3*b*3; 3*c*1; 3*d*1; 3*e*1, 3*e*2 on the opposite side of which the limit position L is, is the closest rope wheel to the detection point p where the rope 2 bypasses beside the limit position L in question.

In FIG. 6, one option of an outline of the rope has been presented by solid line, and an alternative outline of the rope 2 has been presented by broken lines. Accordingly, each thickness directional side of the rope 2 can be either flat as presented by solid line, or contoured to have an uneven surface pattern, such as a polyvee pattern or tooth pattern or any other pattern. FIG. 6 illustrates with broken line an example of a polyvee pattern having grooves and ribs parallel with the longitudinal direction of the rope. The thickness directional sides of the rope 2 can be shaped both flat or both contoured or one flat and one contoured. These are some options, which are preferred but not limited to.

Figure 7:
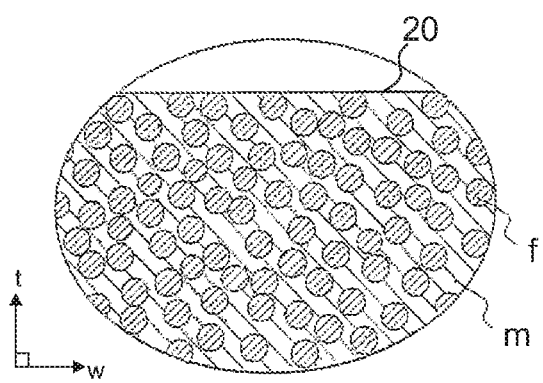
FIGS. 7 and 8 illustrate preferred details of a load bearing member of the rope.
Figure 8:
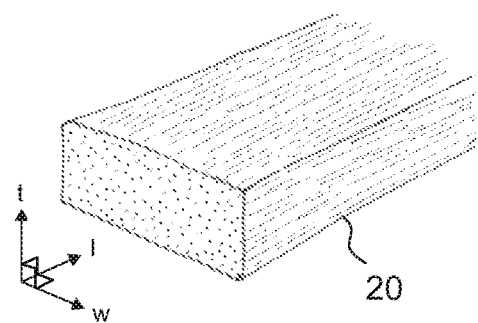

FIG. 7 illustrates a preferred inner structure for the load bearing member 20 made of composite material, showing inside the circle an enlarged view of the cross section of the load bearing member 20 close to the surface thereof, as viewed in the longitudinal direction 1 of the load bearing member 1. The parts of the load bearing member 20 not showed in FIG. 7 have a similar structure. FIG. 8 illustrates a section of the load bearing member 20 three dimensionally. The load bearing member 20 is made of composite material comprising reinforcing fibers f embedded in polymer matrix m. The reinforcing fibers f being in the polymer matrix means here that the individual reinforcing fibers f are bound to each other with a polymer matrix m. This has been done e.g. in the manufacturing phase by immersing them together in the fluid material of the polymer matrix which is thereafter solidified. The reinforcing fibers f are distributed substantially evenly in polymer matrix m and bound to each other by the polymer matrix m. The load bearing member 20 formed is a solid elongated rod-like one-piece structure. Said reinforcing fibers f are most preferably carbon fibers, but alternatively they can be glass fibers, or possibly some other fibers. Preferably, substantially all the reinforcing fibers f of each load bearing member 20 are parallel with the longitudinal direction of the load bearing member 20. Thereby, the fibers f are also parallel with the longitudinal direction of the rope 2 as each load bearing member 20 are to be oriented parallel with the longitudinal direction of the rope 2. This is advantageous for the rigidity as well as behavior in bending. Owing to the parallel structure, the fibers in the rope 2 will be aligned with the force when the rope 2 is pulled, which ensures that the structure provides high tensile stiffness. The fibers f used in the preferred embodiments are accordingly substantially untwisted in relation to each other, which provides them said orientation parallel with the longitudinal direction of the rope 2. This is in contrast to the conventionally twisted elevator ropes, where the wires or fibers are strongly twisted and have normally a twisting angle from 15 up to 40 degrees, the fiber/wire bundles of these conventionally twisted elevator ropes thereby having the potential for transforming towards a straighter configuration under tension, which provides these ropes a high elongation under tension as well as leads to an unintegral structure. The reinforcing fibers f are preferably long continuous fibers in the longitudinal direction of the load bearing member 20, preferably continuing for the whole length of the load bearing member 20.

As mentioned, the reinforcing fibers f are preferably distributed in the aforementioned load bearing member 20 substantially evenly. The fibers f are then arranged so that the load bearing member 20 would be as homogeneous as possible in the transverse direction thereof. An advantage of the structure presented is that the matrix m surrounding the reinforcing fibers f keeps the interpositioning of the reinforcing fibers f substantially unchanged. It equalizes with its slight elasticity the distribution of force exerted on the fibers, reduces fiber-fiber contacts and internal wear of the rope, thus improving the service life of the rope 2. Owing to the even distribution, the fiber density in the cross-section of the load bearing member 20 is substantially constant. The composite matrix m, into which the individual fibers f are distributed, is most preferably made of epoxy, which has good adhesiveness to the reinforcement fibers f and which is known to behave advantageously with reinforcing fibers such as carbon fiber particularly. Alternatively, e.g. polyester or vinyl ester can be used, but basically any other suitable alternative materials can be used.

The matrix m has been applied on the fibers f such that a chemical bond exists between each individual reinforcing fiber f and the matrix m. Thereby a uniform structure is achieved. To improve the chemical adhesion of the reinforcing fiber to the matrix m, in particular to strengthen the chemical bond between the reinforcing fiber f and the matrix m, each fiber can have a thin coating, e.g. a primer (not presented) on the actual fiber structure between the reinforcing fiber structure and the polymer matrix m. However, this kind of thin coating is not necessary. The properties of the polymer matrix m can also be optimized as it is common in polymer technology. For example, the matrix m can comprise a base polymer material (e.g. epoxy) as well as additives, which fine-tune the properties of the base polymer such that the properties of the matrix m are optimized. The polymer matrix m is preferably of a hard non-elastomer, such as said epoxy, as in this case a risk of buckling can be reduced for instance. However, the polymer matrix need not be non-elastomer necessarily, e.g. if the downsides of this kind of material are deemed acceptable or irrelevant for the intended use. In that case, the polymer matrix m can be made of elastomer material such as polyurethane or rubber for instance.

The reinforcing fibers f together with the matrix m form a uniform load bearing member, inside which no substantial abrasive relative movement occurs when the rope is bent. The individual reinforcing fibers f of the load bearing member 20 are mainly surrounded with polymer matrix m, but random fiber-fiber contacts can occur because controlling the position of the fibers in relation to each other in their simultaneous impregnation with polymer is difficult, and on the other hand, elimination of random fiber-fiber contacts is not necessary from the viewpoint of the functioning of the solution. If, however, it is desired to reduce their random occurrence, the individual reinforcing fibers f can be pre-coated with material of the matrix m such that a coating of polymer material of said matrix is around each of them already before they are brought and bound together with the matrix material, e.g. before they are immersed in the fluid matrix material.

As above mentioned, the matrix m of the load bearing member 20 is most preferably hard in its material properties. A hard matrix m helps to support the reinforcing fibers f, especially when the rope bends, preventing buckling of the reinforcing fibers f of the bent rope, because the hard material supports the fibers f efficiently. To reduce the buckling and to facilitate a small bending radius of the load bearing member 0, among other things, it is therefore preferred that the polymer matrix m is hard, and in particular non-elastomeric. The most preferred materials for the matrix are epoxy resin, polyester, phenolic plastic or vinyl ester. The polymer matrix m is preferably such that its module of elasticity (E) is over 2 GPa, most preferably over 2.5 GPa. In this case the module of elasticity E is preferably in the range 2.5-10 GPa, most preferably in the range 2.5-4.5 GPa. There are commercially available various material alternatives for the matrix m which can provide these material properties. Preferably over 50% proportion of the surface area of the cross-section of the load bearing member 20 is of the aforementioned reinforcing fiber, preferably such that 50%-80% proportion is of the aforementioned reinforcing fiber, more preferably such that 55%-70% proportion is of the aforementioned reinforcing fiber, and substantially all the remaining surface area is of polymer matrix m. Most preferably, this is carried out such that approx. 60% of the surface area is of reinforcing fiber and approx. 40% is of matrix material (preferably epoxy material). In this way a good longitudinal stiffness for the load bearing member 1 is achieved. As mentioned carbon fiber is the most preferred fiber to be used as said reinforcing fiber due to its excellent properties in hoisting appliances, particularly in elevators. However, this is not necessary as alternative fibers could be used, such as glass fiber, which has been found to be suitable for the hoisting ropes as well. The load bearing member 20 is preferably completely non-metallic, i.e. made not to comprise metal.

In the preferred embodiments, advantageous structures for the load bearing members 20 and the rope 2 have been disclosed. However, the invention can be utilized with load bearing members and the ropes having other kind of structure such as with those having different materials and/or shapes and/or dimension ratios.

It is to be understood that the above description and the accompanying Figures are only intended to teach the best way known to the inventors to make and use the invention. It will be apparent to a person skilled in the art that the inventive concept can be implemented in various ways. The above-described embodiments of the invention may thus be modified or varied, without departing from the invention, as appreciated by those skilled in the art in light of the above teachings. It is therefore to be understood that the invention and its embodiments are not limited to the examples described above but may vary within the scope of the claims.

The invention claimed is:

1. An elevator arrangement, comprising:
   a rope connected with an elevator car, the rope being a rod elastically bendable away from a straight form while under a bending tension and urged towards the straight form as the bending tension drops;
   a rope wheel around which the rope passes turning around an axis, which extends in width direction of the rope, the rope losing contact with a rim of the rope wheel at a departing point; and
   a rope position detector arranged to, detect displacement of the rope over a limit position in a thickness direction of the rope at a detection point as the rope shifts towards the limit position in response to the bending tension dropping as the rod is urged towards the straight form with the rope position detector being positioned relative to the rope wheel based on a recoil of the rod as the rod is urged towards the straight form as the bending tension of the rod drops such that the detection point is between 0.15 and 0.35 meters below a radial plane of the rope wheel corresponding to the departing point on the rim of the rope wheel, and on an opposite side of the rope from the rope wheel, and trigger one or more actions in response to detecting the displacement of the rope in the thickness direction of the rope over the limit position.

2. The elevator arrangement according to claim 1, wherein the rope is arranged to pass tangentially away from the rope wheel further to the detection point where, prior to the drop in the bending tension, the rope does not cross the limit position while unsupported in the thickness direction thereof.

3. The elevator arrangement according to claim 1, wherein said one or more actions include one or more of stopping the elevator car, preventing further starts of elevator car, sending an alarm signal.

4. The elevator arrangement according to claim 1, wherein said limit position is at a distance from the rope in thickness-direction of the rope.

5. The elevator arrangement according to claim 1, wherein a departing point where the rope departs from a rim of the rope wheel and the detection point are at a distance from each other, the distance being between 0.15 and 0.35 meters.

6. The elevator arrangement according to claim 1, wherein the rope position detector is arranged to sense ultrasonic sound or electromagnetic radiation from said limit position.

7. The elevator arrangement according to claim 1, wherein the rope position detector comprises:
a receiver arranged to receive ultrasonic sound or electromagnetic radiation from said limit position, the receiver including one or more photocells, one or more laser beam sensors, one or more ultrasonic sensing devices, one or more optical cameras, one or more scanners, one or more machine vision devices, or one or more pattern recognition devices.

8. The elevator arrangement according to claim 1, wherein the rope position detector comprises:
a sensing member positioned at the limit position on a thickness direction side of the rope, which sensing member is displaceable by the rope, in response to displacement of the rope displaced in the thickness direction to collide into contact with the sensing member.

9. The elevator arrangement according to claim, 8 wherein a surface portion of the sensing member facing the rope comprises non-metallic material.

10. The elevator arrangement according to claim 8, wherein the sensing member is displaceable at least in a longitudinal direction of the rope, whereby the rope, when it moves in its longitudinal direction during elevator use and is displaced in the thickness direction to collide into contact with the sensing member, is arranged to engage the sensing member and push and displace it at least in the longitudinal direction of the rope.

11. The elevator arrangement according to claim 1, wherein said rope comprises:
one or more load bearing members extending parallel with a longitudinal direction of the rope unbroken throughout a length of the rope, which one or more load bearing members are made of a composite material including reinforcing fibers in a polymer matrix, said reinforcing fibers being carbon fibers.

12. The elevator arrangement according to claim 1, wherein said rope comprises a non-metallic coating.

13. An elevator comprising:
the elevator arrangement in according to claim 1; and
the elevator car.

14. A rope position detector comprising:
a sensing member positioned at a limit position on a thickness direction side of a rope, the rope being a rod elastically bendable away from a straight form while under a bending tension and urged towards the straight form as the bending tension drops, the sensing member configured to,
detect displacement of a rope over the limit position in the thickness direction of the rope at a detection point as the rope shifts towards the limit position in response to the bending tension dropping as the rod is urged towards the straight form with the sensing member being positioned relative to a rope wheel based on a recoil of the rod as the rod is urged towards the straight form as the bending tension of the rod drops such that the detection point is between 0.15 and 0.35 below a radial plane of the rope wheel corresponding to a departing point on a rim of the rope wheel, and on an opposite side of the rope from the rope wheel, and
trigger one or more actions in response to detecting the displacement of the rope in the thickness direction of the rope over the limit position.

* * * * *